(12) United States Patent
Kurashita (10) Patent No.: US 8,926,013 B2
(45) Date of Patent: Jan. 6, 2015

(54) SEAT

(71) Applicant: Delta Kogyo Co., Ltd., Hiroshima (JP)

(72) Inventor: Takashi Kurashita, Hiroshima (JP)

(73) Assignee: Delta Kogyo Co., Ltd. (JP)

( * ) Notice: Subject to any disclaimer, the term of this patent is extended or adjusted under 35 U.S.C. 154(b) by 0 days.

(21) Appl. No.: 14/068,529

(22) Filed: Oct. 31, 2013

(65) Prior Publication Data

US 2014/0125108 A1    May 8, 2014

(30) Foreign Application Priority Data

Nov. 8, 2012   (JP) ................. 2012-246269

(51) Int. Cl.
| | | |
|---|---|---|
| *A47C 31/02* | (2006.01) | |
| *B60N 2/68* | (2006.01) | |
| *B60N 2/70* | (2006.01) | |
| *B60N 2/72* | (2006.01) | |

(52) U.S. Cl.
CPC ............. *B60N 2/68* (2013.01); *B60N 2/7011* (2013.01); *B60N 2/72* (2013.01)
USPC ................... 297/218.3; 297/218.5

(58) Field of Classification Search
CPC .. B60N 2/6027; B60N 2/6045; B60N 2/5825; B60N 2/5841

USPC ................. 297/452.56, 218.3, 218.5
See application file for complete search history.

(56) References Cited

U.S. PATENT DOCUMENTS

| | | | | |
|---|---|---|---|---|
| 3,596,989 | A * | 8/1971 | Van Ryn et al. | 297/228.11 |
| 6,406,093 | B1 * | 6/2002 | Miotto et al. | 297/218.5 |
| 7,891,735 | B2 * | 2/2011 | Oku | 297/218.3 |
| 8,157,324 | B2 * | 4/2012 | Matsuzaki et al. | 297/218.1 |
| 2006/0279119 | A1 | 12/2006 | Fujita et al. | |
| 2013/0062918 | A1 * | 3/2013 | Itakura | 297/219.1 |

FOREIGN PATENT DOCUMENTS

| | | |
|---|---|---|
| DE | 102011018567 | 10/2012 |
| EP | 0063193 | 10/1982 |
| FR | 2534464 | 4/1984 |
| JP | 2002-306273 | 10/2002 |
| JP | 2003-9996 | 1/2003 |

* cited by examiner

*Primary Examiner* — Sarah B McPartlin
(74) *Attorney, Agent, or Firm* — Gerald E. Hespos; Michael J. Porco; Matthew T. Hespos (57) ABSTRACT

Provided is a seat which comprises: a seat frame constituting a framework for a seat cushion or seat back; a synthetic resin hook member having a locking portion locked to a frame member as a part of the seat frame; a stretchable planar elastic body attached to the hook member locked to the frame member so as to be mounted to the seat frame in a tensioned state; and an anti-expansion mechanism for avoiding a situation where the hook member is expanded and thereby the hook member is disengaged from the frame member.

4 Claims, 5 Drawing Sheets

SEAT

TECHNICAL FIELD

The present invention relates to a seat comprising a seat frame and a planar elastic body mounted to the seat frame in a tensioned state.

BACKGROUND ART

Figure 5A:
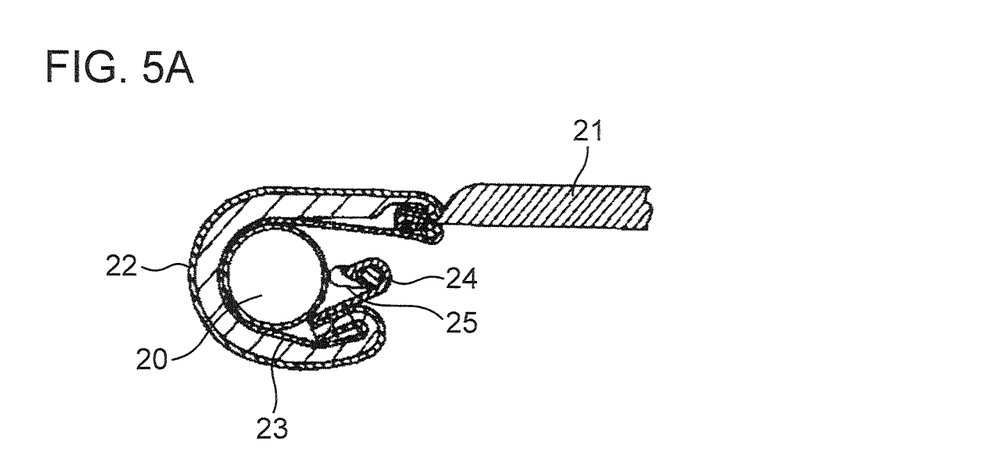
FIGS. 5A and 5B are sectional views for explaining background arts.

Heretofore, for example, there has been known a seat of the type described in JP 2002-306273A. As illustrated in FIG. 5A, this type of seat comprises a seat frame 20, and a stretchable planar elastic body 21 mounted to the seat frame 20 in a tensioned state.

More specifically, the planar elastic body 21 has an end to which respective one ends of an elastic skin 22 and a stay cloth 23 are sewn. The other ends of the elastic skin 22 and the stay cloth 23 are locked to a wire body 25 of the seat frame 20 through a hook member 24 composed of a generally J-shaped synthetic resin body, and intermediate portions of the elastic skin 22 and the stay cloth 23 are wound around the seat frame. In this way, the planar elastic body 21 is mounted to the seat frame 20 in a tensioned state.

Figure 5B:
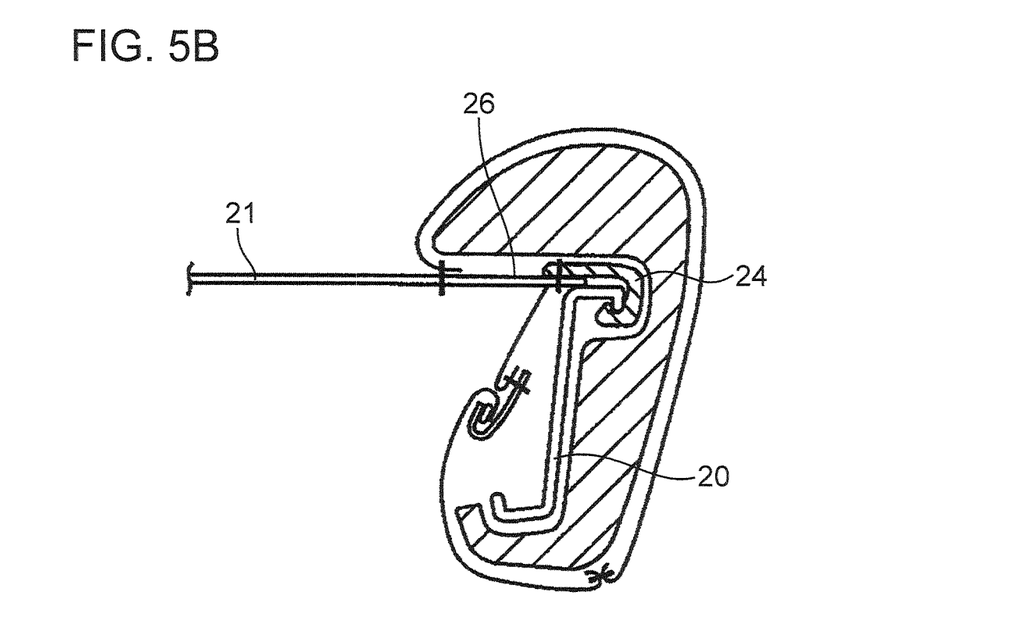

There has also been known a seat of the type described in JP 2003-09996A. As illustrated in FIG. 5B, this type of seat comprises a seat frame (main frame) 20, and a planar elastic body (net) 21 provided inside the seat frame 20 in a tensioned state.

More specifically, the planar elastic body 21 has an end to which a selvage cloth 26 is sewn, and a J-shaped hook member (frame hook) 24 is sewn to the selvage cloth 26. Then, the hook member 24 is locked to the seat frame 20, thereby allowing the planar elastic body 21 to be mounted to the seat frame 20 in a tensioned state. Although the JP 2003-09996A does not particularly mention a material of the hook member 24, it may be assumed to be a synthetic resin, because the hook member 24 is attached to the selvage cloth 26 by sewing.

In cases where the above mounting structure of the planar elastic body 21 is employed in a seat cushion, a relatively large load based on a body weight of a seated person who is seated in the seat cushion is applied to the hook member 24 through the planar elastic body 21. On the other hand, in cases where the above mounting structure is employed in a seat back, a relatively large load is also applied to the hook member 24 through the planar elastic body 21 when a seated person leans against the seat back.

When such a large load is applied to the synthetic resin hook member 24, a locking portion of the hook member 24 with respect to the seat frame 20 undergoes flexural deformation, which is likely to lead to a situation where the locking portion is expanded and thereby the hook member 24 is disengaged from the seat frame 20. If the disengagement of the hook member 24 occurs, a support function of the planar elastic body 21 is spoiled, causing, in a seat cushion, a problem that a seated person's hip undesirably sinks downwardly, and, in a seat back, a problem that a seated person's back undesirably sinks rearwardly.

SUMMARY OF THE INVENTION

The present invention has been made to solve the above problems, and an object thereof is to provide a seat which is improved to prevent disengagement of a hook member from a seat frame, even when a large load is applied to a stretchable planar elastic body.

In order to achieve this object, the present invention provides a seat which comprises: a seat frame constituting a framework for a seat cushion or seat back; a synthetic resin hook member having a locking portion locked to a frame member as a part of the seat frame; a stretchable planar elastic body attached to the hook member locked to the frame member so as to be mounted to the seat frame in a tensioned state; and an anti-expansion mechanism for avoiding a situation where the hook member is expanded and thereby the hook member is disengaged from the frame member.

The present invention can prevent disengagement of the hook member from the seat frame, even when a large load is applied to the stretchable planar elastic body.

BRIEF DESCRIPTION OF THE DRAWINGS

FIGS. 2A and 2B are side sectional views illustrating a structure of a relevant part of an automobile seat according to a first embodiment of the present invention, wherein FIG. 2A illustrates a state after a second hook member is locked to a first hook member, and FIG. 2B illustrates a state before the locking.

FIGS. 3A and 3B are side sectional views illustrating a structure of a relevant part of an automobile seat according to a second embodiment of the present invention, wherein FIG. 3A illustrates a state after a planar elastic body is locked to a hook pin, and FIG. 3B illustrates a state before the locking.

FIGS. 4A and 4B are side sectional views illustrating a structure of a relevant part of an automobile seat according to a third embodiment of the present invention, wherein FIG. 4A illustrates a state after a pawl portion of a first hook member is locked to a base end, and FIG. 3B illustrates a state before the locking.

DESCRIPTION OF EMBODIMENTS

Figure 1:
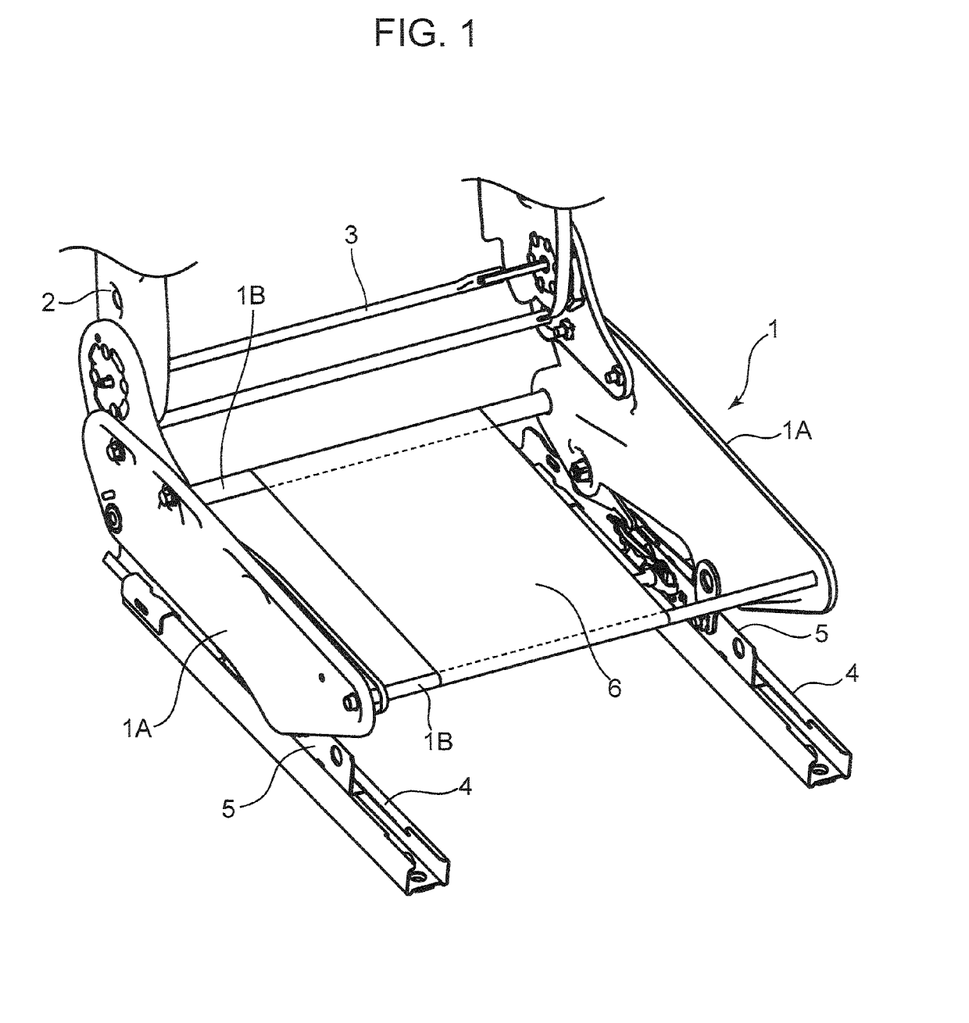
FIG. 1 is a perspective view illustrating a seat frame in an automobile seat according to each embodiment of the present invention.
Figure 2A:
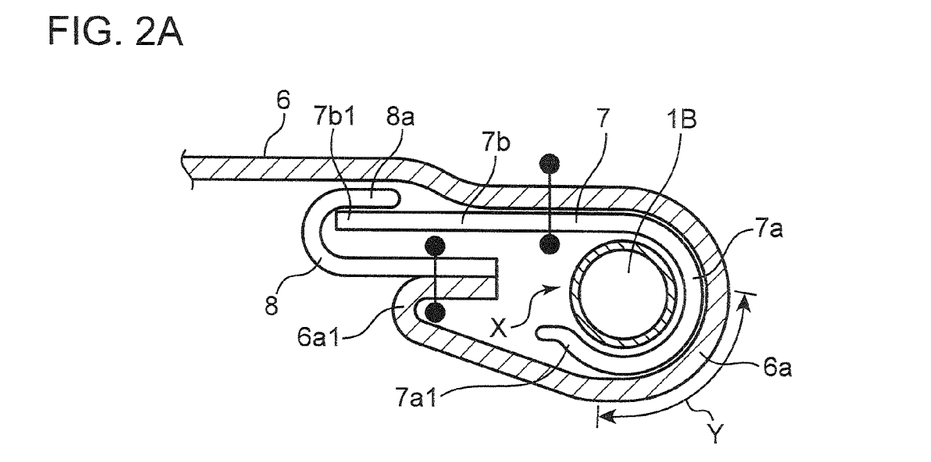
Figure 2B:
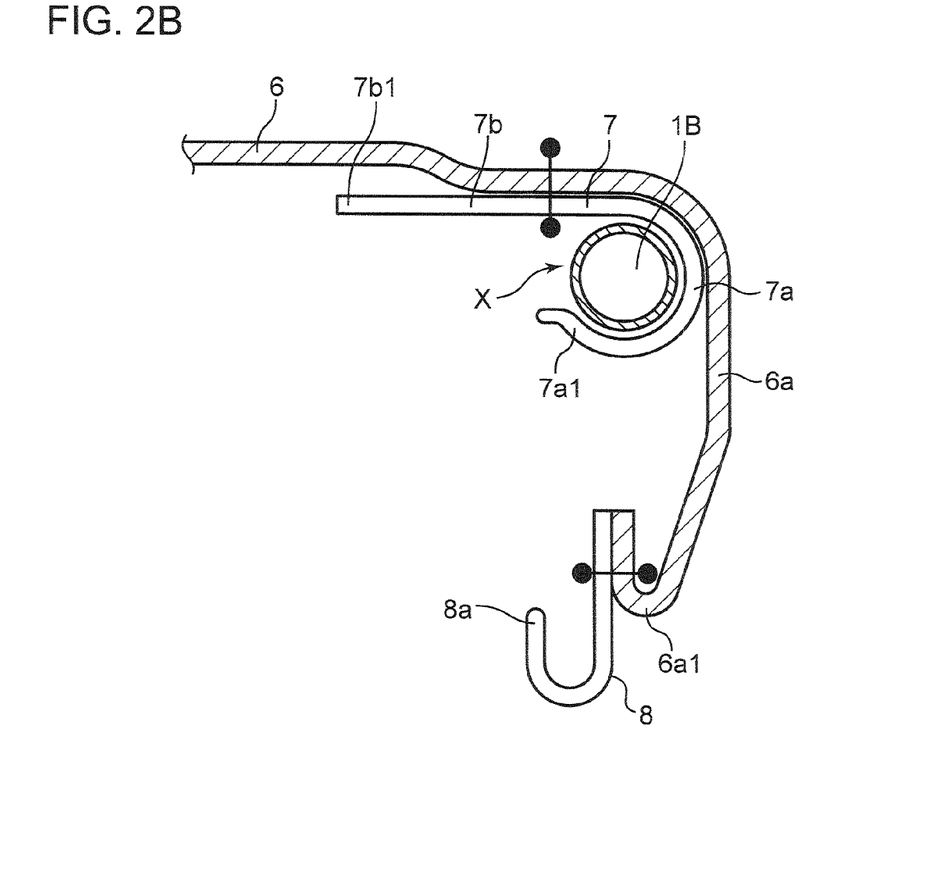

With reference to FIGS. 1, 2A and 2B, a first embodiment of the present invention will now be described.

As illustrated in FIG. 1, an automobile seat according to the first embodiment comprises therein a cushion frame 1 constituting a framework for a seat cushion, and a back frame 2 constituting a framework for a seat back. The back frame 2 is supported tiltably in a front-rear direction of an automobile body with respect to the cushion frame 1 via a reclining mechanism including a reclining shaft 3. In the first embodiment, an anti-expansion mechanism in the present invention is applied to a lock section between the cushion frame 1 and an aftermentioned first hook member 7, although details thereof will become apparent from the following description. Thus, in the first embodiment, the cushion frame 1 is equivalent to "seat frame" set forth in the appended claims.

The cushion frame 1 comprises a pair of right and left first frame members 1A, 1A, and a pair of front and rear second frame members 1B, 1B each extending in a width direction of the automobile body to couple the first frame members 1A, 1A together. The second frame member 1B is equivalent to "frame member" set forth in the appended claims. In the first embodiment, the second frame member 1B equivalent to the "frame member" is composed of a hollow, circular cylindrical-shaped metal pipe member (see FIGS. 2A and 2B). However, a structure of the second frame member 1B is not limited thereto, but a solid bar member may be used as the second frame member 1B. Further, a cross-sectional shape of the second frame member 1B is not limited to a circular shape.

Each of the first frames 1A, 1A is provided with a slider 5 at a bottom thereof. The slider 5 is slidably supported by a rail installed on an upper surface of a floor of a passenger compartment of the automobile body to extend in the front-rear direction.

A planar elastic body 6 is mounted across the front second frame member 1B and the rear second frame member 1B in a tensioned (i.e., stretched) state. The planar elastic body 6 includes, for example, a stretchable (elastically deformable) net, also called "cushion base net". For example, a stay cloth may be sewn to a peripheral edge or the like of the net. In this case, an assembly of the stay cloth and the net corresponds to the planar elastic body 6. For example, as the net for the planar elastic body 6, it is possible to use the "net-like planar elastic body" disclosed in JP 2000-116460A. Therefore, any further detailed description about a structure of the planar elastic body 6 itself will be omitted.

As illustrated in FIG. 2A, a front end portion 6a of the planar elastic body 6 is locked to the front second frame member 1B through a first hook member 7. Further, although not specifically illustrated, a rear end portion of the planar elastic body 6 is also locked to the rear second frame member 1B through the same member as the first hook member 7. As above, a lock structure between the front end portion 6a of the planar elastic body 6 and the front frame member 1B is identical to a lock structure between the rear end portion of the planar elastic body 6 and the rear second frame member 1B. Thus, only the lock structure between the front end portion 6a of the planar elastic body 6 and the front frame member 1B will be described below. In the case where the planar elastic body 6 comprises a net and a stay cloth sewn to a front end, etc., thereof, the front end portion 6a of the planar elastic body 6 comprises the stay cloth. The same applies to the rear end portion of the planar elastic body 6.

As illustrated in FIGS. 2A and 2B, the first hook member 7 (also called "cover finisher") is made of a synthetic resin and is attached to a back surface (lower surface) of the front end portion 6a of the planar elastic body 6, for example, by sewing using a sewing thread. The first hook member 7 is equivalent to "hook member" set forth in the appended claims. In the first embodiment, the first hook member 7 equivalent to the "hook member" is formed in a generally J shape in side view, and has a base portion 7b extending in a specific direction and a locking portion 7a extending from a distal end of the base portion 7b to form an arc shape. More specifically, the locking portion 7a is formed in a shape similar to an arc having a central angle of 180 degree or more, and a diameter thereof is set to a value slightly greater than an outer diameter of the second frame member 1B. The locking portion 7a defines a mouth X which is capable of receiving the second frame member 1B therethrough.

The locking portion 7a of the first hook member 7 is locked to an outer peripheral surface of the second frame member 1B, while pulling and stretching the planar elastic body 6 in the front-rear direction. In other words, the planar elastic body 6 is locked to the second frame member 1B through the first hook member 7, while maintaining tension thereof at a given level.

If the locking portion 7a of the first hook member 7 is simply locked to the second frame member 1B, when a relatively large load is applied to the first hook member 7 through the planar elastic body 6, the first hook member 7 undergoes flexural deformation, which is likely to lead to a situation where the mouth X of the locking portion 7a is expanded and thereby the first hook member 7 is disengaged from the second frame member 1B.

Therefore, the automobile seat according to the first embodiment is provided with an anti-expansion mechanism for avoiding a situation where the locking portion 7a of the first hook member 7 from is expanded.

Specifically, the anti-expansion mechanism in the first embodiment comprises a combination of the front end portion 6a of the planar elastic body 6 and an aftermentioned second hook member 8.

The front end portion 6a of the planar elastic body 6 is wound around the locking portion 7a of the first hook member 7 to cover an approximately entire outer peripheral surface of the locking portion 7a. That is, with respect to the locking portion 7a which is formed in an arc shape having a central angle of 180 degrees or more, the front end portion 6a of the planar elastic body 6 is wound therearound over a range of a central angle of about 180 degree which corresponds to a most part of the locking portion 7a (to form a semi-circular shape). Further, the front end portion 6a of the planar elastic body 6 is formed to extend up to a position inward (in FIG. 2A, leftward) of the cushion frame 1 with respect to a distal end 7a1 of the locking portion 7a.

A second hook member 8 made of a synthetic resin and formed in a generally J shape is attached to a terminal end 6a1 of the planar elastic body 6 which is a distalmost region of the front end portion 6a of the planar elastic body 6, for example, by sewing using a sewing thread.

The second hook member 8 is equivalent to "additional hook piece" set forth in the appended claims, and has a locking portion 8a lockable to a base end 7b1 of the base portion 7b of the first hook member 7. The locking portion 8a of the second hook member 8 is locked to the base end 7b1 of the first hook member 7, while pulling and stretching the front end portion 6a of the planar elastic body 6 inwardly (in FIG. 2A, leftwardly) with respect to the cushion frame 1. In other words, the front end portion 6a of the planar elastic body 6 is locked to the first hook member 7 through the second hook member 8, while maintaining tension thereof at a given level.

As above, in the first embodiment of the present invention, the first hook member 7 is attached to the stretchable planar elastic body 6, and the locking portion 7a of the first hook member 7 is locked to the outer peripheral surface of the second frame member 1B. The second hook member 8 is additionally attached to the planar elastic body 6. The locking portion 8a of the second hook member 8 is locked to the base end 7b1 of the base portion 7b of the first hook member 7, and the front end portion 6a of the planar elastic body 6 is wound around the outer peripheral surface of the locking portion 7a of the first hook member 7. In this structure, a combination of the front end portion 6a of the planar elastic body 6 and the second hook member 8 functions as the anti-expansion mechanism for avoiding a situation where the first hook member 7 is flexurally deformed to expand the mouth X of the locking portion 7a.

That is, in the first embodiment, when the planar elastic body 6 is pulled and stretched inwardly by receiving a relatively large load, for example, based on a body weight of a seated person, a circumferential tension is applied to a region of the planar elastic body 6 being wound around the locking portion 7a of the first hook member 7. Thus, based on this circumferential tension, a clamping force causing the locking portion 7a to come into close contact with the outer peripheral surface of the second frame member 1B is applied to the locking portion 7a from the planar elastic body 6, particularly, from a region of the planar elastic body 6 indicated by the code Y in FIG. 2A. Such a clamping force fulfills a function of avoiding the situation where the synthetic resin first hook member 7 is flexurally deformed to expand the mouth X of the locking portion 7a, so that it becomes possible to effectively prevent disengagement of the first hook member 7 from the second frame member 1B.

In addition, during production of the seat, the planar elastic body 6 can be installed to the cushion frame 1 only by a simple operation of locking the locking portion 8a of the second hook member 8 to the base end 7b1 of the first hook member 7 preliminarily locked to the second frame member 1B, so that operational efficiency of the installation becomes better.

Figure 3A:
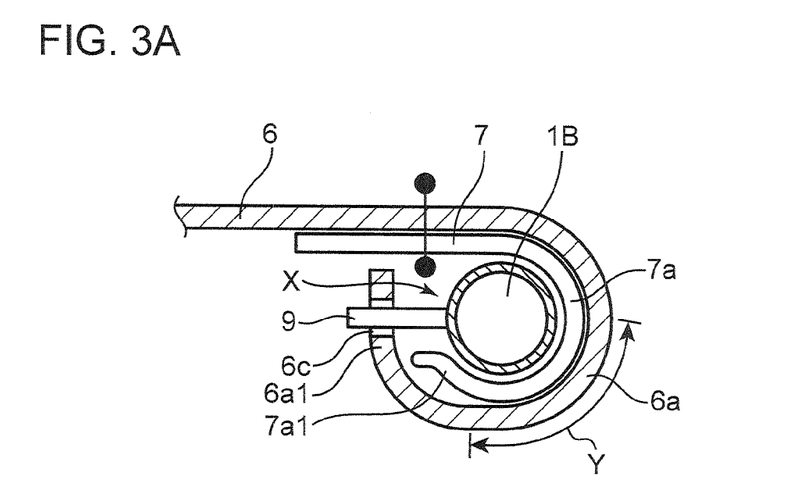
Figure 3B:
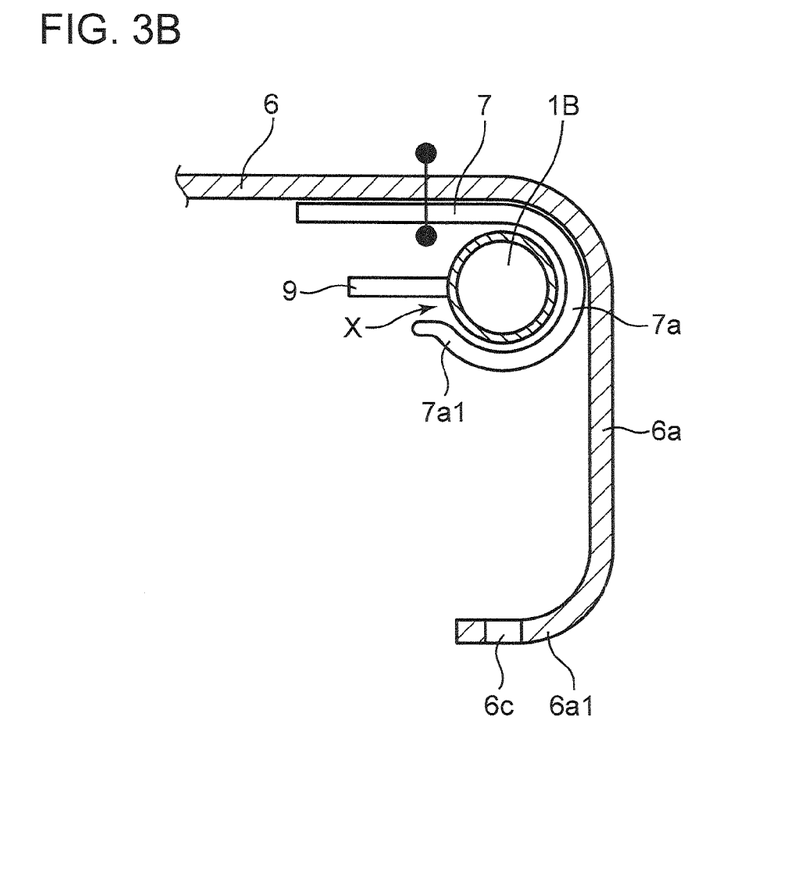

With reference to FIGS. 3A and 3B, a second embodiment of the present invention will be described below. An anti-expansion mechanism in the second embodiment comprises a combination of the front end portion 6a of the planar elastic body 6 and an aftermentioned hook pin 9.

As with the first embodiment, the front end portion 6a of the planar elastic body 6 is wound around the locking portion 7a of the first hook member 7 to cover an approximately entire outer peripheral surface of the locking portion 7a. Further, the front end portion 6a of the planar elastic body 6 is formed to extend up to a position inward (in FIG. 3A, leftward) of the cushion frame 1 with respect to the distal end 7a1 of the locking portion 7a.

A locking hole 6c is formed in the terminal end 6a1 of the planar elastic body 6 which is a distalmost region of the front end portion 6a of the planar elastic body 6. On the other hand, a hook pin 9 is provided on the outer peripheral surface of the second frame member 1B to protrude therefrom inwardly with respect to the cushion frame 1.

The front end portion 6a of the planar elastic body 6 is pulled and stretched inwardly (in FIG. 3A, leftwardly) with respect to the cushion frame 1, and the hook pin 9 is inserted into the locking pin 6c of the stretched planar elastic body 6. In other words, the front end portion 6a of the planar elastic body 6 is locked to the second frame member 1B through the hook pin 9, while maintaining tension thereof at a given level.

As above, in the second embodiment, when the planar elastic body 6 is pressed and stretched inwardly by receiving a relatively large load, for example, based on a body weight of a seated person, a circumferential tension is applied to a region of the planar elastic body 6 being wound around the locking portion 7a of the first hook member 7. Thus, based on this circumferential tension, a clamping force causing the locking portion 7a to come into close contact with the outer peripheral surface of the second frame member 1B is applied to the locking portion 7a from the planar elastic body 6, particularly, from a region of the planar elastic body 6 indicated by the code Y in FIG. 3A. Such a clamping force fulfills a function of avoiding the situation where the synthetic resin first hook member 7 is flexurally deformed to expand the mouth X of the locking portion 7a, so that it becomes possible to effectively prevent disengagement of the first hook member 7 from the second frame member 1B.

In addition, during production of the seat, the planar elastic body 6 can be installed to the cushion frame 1 only by a simple operation of locking the first hook member 7 to the second frame member 1B and then locking the front end portion 6a of the planar elastic body 6 to the hook pin 9 protrudingly provided on the second frame member 1B (inserting the hook pin 9 into the locking hole 6c), so that operational efficiency of the installation becomes better. Furthermore, it is only necessary to add the hook pin 9 having a simple structure composed of a protrusion, so that it becomes possible to reduce a component cost.

Figure 4A:
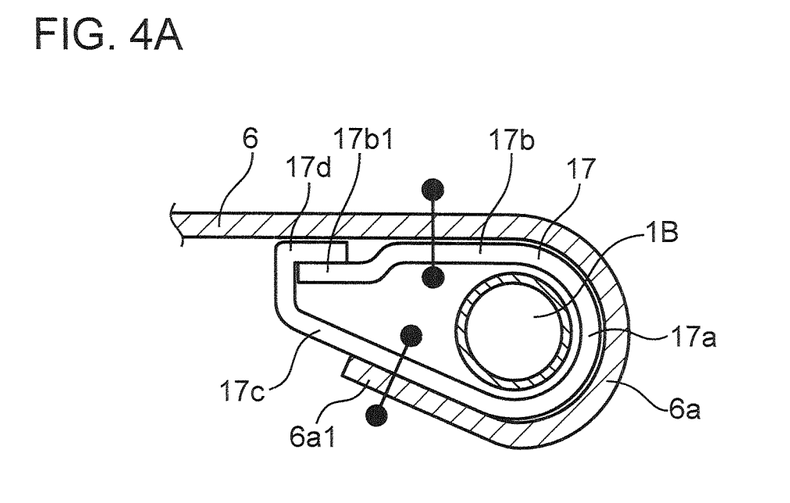
Figure 4B:
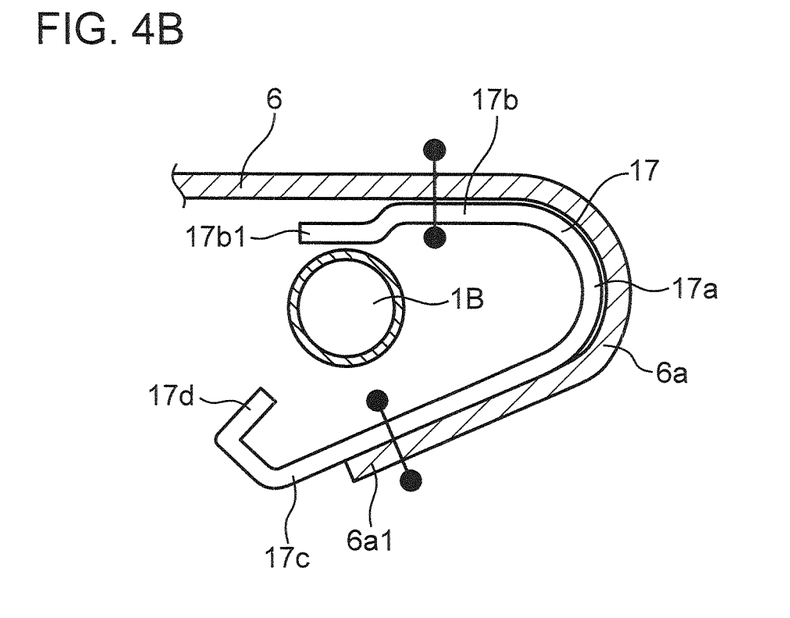

With reference to FIGS. 4A and 4B, a third embodiment of the present invention will be described below. An anti-expansion mechanism in the third embodiment is provided in the following first hook member 17 itself.

Specifically, the first hook member 17 in the third embodiment has: a base portion 17b; a locking portion 17a; an extension portion 17c extending from a distal end of the locking portion 17a inwardly (in FIG. 4A, leftwardly) with respect to the cushion frame 1 and obliquely upwardly; and a pawl portion 17d provided at a distal end of the extension portion 17c and lockable to a base end 17b1 of the base portion 17b.

In an operation of locking the above first hook member 17 to the second frame member 1B, first of all, as illustrated in FIG. 4B, the first hook member 17 is elastically deformed to expand a gap between the base end 17d1 and the pawl portion 17d, and, in this state, the second frame member 1B is inserted into an inside of the first hook member 17. Then, as illustrated in FIG. 4A, the pawl portion 17d of the first hook member 17 is locked to the base end 17b1.

The front end portion 6a of the planar elastic body 6 is wound around not only an outer peripheral surface of the locking portion 17a of the first hook member 17 but also an outer peripheral surface of a part of the extension portion 17c, in a continuous manner. The terminal end 6a1 of the planar elastic body 6 which is a distalmost region of the front end portion 6a of the planar elastic body 6 is attached to the extension portion 17c of the first hook member 17, for example, by sewing using a sewing thread.

In the above third embodiment, even when a relatively large load is applied to the synthetic resin first hook member 17 through the planar elastic body 6, the expansion of the first hook member 17 is avoided by an action of the pawl portion 17d locked to the base end 17b1 of first the hook member 17, so that it becomes possible to reliably prevent disengagement of the first hook member 17 from the second frame member 1B.

As above, in the third embodiment, the first hook member 17 itself is equipped with the anti-expansion mechanism. While the front end portion 6a of the planar elastic body 6 wound around the locking portion 17a of the first hook member 17 brings out a function of clamping the locking portion 17a, but the expansion of the first hook member 17 can be avoided without relying on this clamping force. Thus, a region of the planar elastic body 6 wound around the locking portion 17a and the extension portion 17c may be omitted.

Although the above embodiments have been described based on an example where the anti-expansion mechanism in the present invention is applied to the lock section between the cushion frame 1 and the hook member 7 (17), the anti-expansion mechanism in the present invention may be applied to the back frame 2. Further, the present invention may be applied to any suitable seat other than an automobile seat.

Further, in the above embodiments, a member comprising a stretchable net is used as the planar elastic body 6. However, the planar elastic body 6 is not necessarily limited to such a member comprising a stretchable net, but may be any planar member having stretchability (elasticity).

<Outline of Embodiments>

Lastly, distinctive features of the seat disclosed in the above embodiments and functions/advantageous effects based thereon will be outlined below.

A seat according to the above embodiments comprises: a seat frame (1) constituting a framework for a seat cushion or seat back; a synthetic resin hook member (7; 17) having a locking portion (7a) locked to a frame member (1B) as a part of the seat frame (1); a stretchable planar elastic body (6) attached to the hook member (7; 17) locked to the frame member (1B) so as to be mounted to the seat frame (1) in a tensioned state; and an anti-expansion mechanism for avoiding a situation where the hook member (7; 17) is expanded and thereby the hook member (7; 17) is disengaged from the frame member (1B).

In the above seat, even when a relatively large load is applied to the synthetic resin hook member locked to the frame member, the flexural deformation of the hook member causing the expansion thereof can be avoided by an action of the anti-expansion mechanism, so that it becomes possible to prevent disengagement of the hook member from the seat frame.

Preferably, in the above seat, the locking portion (7a) of the hook member (7) defines a mouth (X) capable of receiving the frame member (1B) therethrough, wherein the anti-expansion mechanism is configured to apply a clamping force generated in an end portion (6a) of the planar elastic body (6) when it is pulled and stretched, to the locking portion (7a) of the hook member (7), thereby avoiding a situation where the hook member (7) is flexurally deformed to expand the mouth (X) of the locking portion (7a).

According to this feature, the locking portion of the hook member is clamped by the end portion of the planar elastic body, so that it becomes possible to reliably avoid the situation where the hook member is flexurally deformed to expand the mouth of the locking portion, thereby effectively preventing the disengagement of the hook member.

More preferably, in the seat having the above feature, the anti-expansion mechanism comprises: an additional hook piece (8) locked to a base end (7b1) of the hook member (7); and the end portion (6a) of the planar elastic body (6) wound around an outer periphery of the locking portion (7a) of the hook member (7) and attached to the additional hook piece (8).

In the case where the end portion of the planar elastic body is wound around the outer periphery of the locking portion of the hook member in this manner, a circumferential tension applied to the end portion of the planar elastic body is converted into a force for clamping the locking portion, so that it becomes possible to reliably avoid the situation where the mouth of the locking portion is expanded. In addition, during production of the seat, the planar elastic body can be installed to the seat frame only by a simple operation of locking the additional hook piece to the base end of the hook member preliminarily locked to the frame member, so that operational efficiency of the installation becomes better.

Alternatively, the anti-expansion mechanism may comprise: a hook pin (9) provided on the frame member (1B) to protrude therefrom; and the end portion (6a) of the planar elastic body (6) wound around an outer periphery of the locking portion (7a) of the hook member (7) and locked to the hook pin (9).

According to this feature, the expansion of the locking portion can be reliably avoided by an action of clamping by the end portion of the planar elastic body wound around the locking portion. In addition, during production of the seat, the planar elastic body can be installed to the seat frame only by a simple operation of locking the hook member to the frame member and then locking the end portion of the planar elastic body to the hook pin protrudingly provided on the frame member, so that operational efficiency of the installation becomes better. Furthermore, it is only necessary to add the hook pin having a simple structure composed of a protrusion, so that it becomes possible to reduce a component cost.

In the above seat, the anti-expansion mechanism may comprise: an extension portion (17c) extending continuously from the locking portion (17a) of the hook member (17), inwardly with respect to the seat frame (1); and a pawl portion (17d) provided at a distal end of the extension portion (17c) and locked to a base end (17b1) of the hook member (17).

According to this feature, even when a relatively large load is applied to the synthetic resin hook member through the planar elastic body, the expansion of the hook member is avoided by an action of the pawl portion locked to the base end of the hook member, so that it becomes possible to reliably prevent disengagement of the hook member from the frame member.

This application is based on Japanese Patent application No. 2012-246269 filed in Japan Patent Office on Nov. 8, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A seat comprising:
    a seat frame including a cylindrical frame member and constituting a framework for a seat;
    a synthetic resin hook member locked to the cylindrical frame member; and
    a planar elastic body attached to the hook member and mounted to the seat frame in a tensioned state, wherein the hook member includes
        an arc-shaped locking portion wound around an outer peripheral surface of the cylindrical frame member, and
        a base portion extending from the arc-shaped locking portion inwardly with respect to the seat frame, the base portion perpendicularly intersecting an axial direction of the cylindrical frame member,
    the planar elastic body includes
        a support portion for receiving a load of a cushion material and a seated person, and
        an end portion wound around an outer peripheral surface of the hook member and held by a holding mechanism disposed on an inner side of the cylindrical frame member and on a backside of the support portion, the holding mechanism engaging the end portion of the planar elastic body and being engaged with the base portion of the hook member to fixedly hold the planar elastic body on the cylindrical frame member, and
    the support portion being located above the base portion of the hook member and fixedly connected to the base portion of the hook member at a predetermined position.

2. The seat as defined in claim 1, wherein the holding mechanism comprises an additional hook piece fixedly attached to the end of the planar elastic body and locked to the base portion of the hook member.

3. The seat as defined in claim 1, wherein the holding mechanism comprises an extension portion extending from an end opposite the base portion of the arc-shaped locking portion inwardly with respect to the seat frame and perpendicularly intersecting the axial direction of the cylindrical frame member, and a pawl portion provided at a distal end of the extension portion and locked to the base portion of the hook member, the extension portion being fixedly attached with the end of the planar elastic body.

4. A seat comprising:
- a seat frame including a cylindrical frame member and constituting a framework for a seat;
- a synthetic resin hook member locked to the cylindrical frame member, the hook member including an arc-shaped locking portion wound around an outer peripheral surface of the cylindrical frame member, and a base portion extending from the arc-shaped locking portion inwardly with respect to the seat frame, the base portion perpendicularly intersecting an axial direction of the cylindrical frame member;
- a planar elastic body attached to the hook member and mounted to the seat frame in a tensioned state, the planar elastic body including a support portion for receiving a load of a cushion material and a seated person, an end portion wound around an outer peripheral surface of the hook member, the support portion being located above the base portion of the hook member and fixedly connected to the base portion of the hook member at a predetermined position; and
- a holding mechanism disposed on an inner side of the cylindrical frame member and on a backside of the support portion, the holding mechanism engaging the end portion of the planar elastic body and being engaged with the base portion of the hook member to fixedly hold the planar elastic body of the cylindrical frame member.

* * * * *